United States Patent
Jung et al.

(10) Patent No.: US 11,779,160 B2
(45) Date of Patent: Oct. 10, 2023

(54) BLENDER

(71) Applicant: LG ELECTRONICS INC., Seoul (KR)

(72) Inventors: Sangjin Jung, Seoul (KR); Mingyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 16/994,002

(22) Filed: Aug. 14, 2020

(65) Prior Publication Data

US 2021/0059475 A1    Mar. 4, 2021

(30) Foreign Application Priority Data

Aug. 29, 2019  (KR) .......................... 10-2019-0106703

(51) Int. Cl.
*A47J 43/07* (2006.01)
*A47J 43/046* (2006.01)

(52) U.S. Cl.
CPC ......... *A47J 43/0716* (2013.01); *A47J 43/046* (2013.01)

(58) Field of Classification Search
CPC ............................. A47J 43/0716; A47J 43/046
USPC .......................... 241/101.3, 92, 282.1–282.2
See application file for complete search history.

(56) References Cited

U.S. PATENT DOCUMENTS

| 9,398,830 B2* | 7/2016 | Lee ....................... A47J 43/085 |
| 2002/0176320 A1* | 11/2002 | Wulf .................... A47J 43/0727 366/205 |
| 2011/0222367 A1* | 9/2011 | Allen ................... A47J 43/0716 428/156 |
| 2016/0117022 A1* | 4/2016 | Kim ........................ F24C 15/02 345/82 |

FOREIGN PATENT DOCUMENTS

WO    2017063962 A1    4/2017

* cited by examiner

*Primary Examiner* — Katrina M Stransky
*Assistant Examiner* — Teresa A Guthrie
(74) *Attorney, Agent, or Firm* — Bryan Cave Leighton Paisner LLP

(57) ABSTRACT

A blender includes an outer case made of a metal material and forming an outer appearance, an inner case received inside the outer case, a jar configured to be seated on a seating portion formed on an upper surface of the inner case and provided with a blade for processing food, and a motor assembly provided inside the inner case and connectable to the blade to rotate the blade. A mounting portion is recessed from the upper surface of the inner case and a touch device is mounted on the mounting portion, and through which a user's manipulation is inputted, in which the touch device is in close contact with a rear surface of the outer case and recognizes a touch manipulation of the outer case by the user.

20 Claims, 14 Drawing Sheets

BLENDER

CROSS-REFERENCE TO RELATED APPLICATION(S)

The application claims priority under 35 U.S.C. § 119 and 35 U.S.C. § 365 to Korean Patent Applications No. 10-2019-0106703 filed in Korea on Aug. 29, 2019 whose entire disclosure is hereby incorporated by reference.

BACKGROUND

The present disclosure relates to a blender.

In general, a blender is a household appliance that chops food contained in a container, crushes the food into powder, or turns the food into a state such as a liquid using a blade rotated by an electric motor, and is also commonly referred to as a mixer.

In a typical blender, a container is seated on an upper surface of a main body in which a motor is built, and when the container is seated, a blade inside the container is connected to a rotational shaft of the motor to be rotatable. In addition, the user can drive the motor by operating the main body after putting food in the container, and the blade is rotated by the driving of the motor to crush the food.

Such a blender has recently been developed as a large-capacity blender having a large container size, and a blender using a motor rotating at ultra-high speed capable of crushing various foods more effectively has been developed.

In addition, the blender may perform manipulation for crushing various foods, and a blender has been developed to crush various foods through simple manipulation.

In the International Patent Publication PCT/EP2016/074116, a control button that is manipulated to be rotated may be provided on a front surface of a base part on which the container is seated. The user manipulates the control button to operate the blender according to a preset cooking program, and a blender capable of inputting operation of the blender by simple manipulation of the user is disclosed. In addition, a display screen may be provided on the front surface of the base part, a cooking program selected through the control button may be displayed through the display screen, and a blender capable of easily inputting manipulation by a user is disclosed.

However, in this related art, the display screen including a knob has a structure of being always exposed to the outside of the blender. Therefore, there is a problem in that an outer appearance due to the exposure of the display screen is inhibiting regardless of whether or not the blender is used.

In addition, there is a problem that the entire display screen needs to be replaced when the display screen malfunctions.

In addition, there is a problem in that the display screen is disposed on the front surface of the blender with the knob, and thus the manipulation recognition is not easy.

SUMMARY

One aspect of the present disclosure is to provide a blender with an improved outer appearance while being capable of displaying an operation on the outside of a main body and the manipulating thereof.

Another aspect of the present disclosure is to provide a blender with improved manipulability and recognition performance.

Another aspect of the present disclosure is to provide a blender with improved maintenance performance.

A blender according to an embodiment of the present disclosure may include an outer case forming an outer appearance, an inner case configured to be received inside the outer case, a jar configured to be seated on a seating portion formed on an upper surface of the inner case and provided with a blade for processing food, a motor assembly provided inside the inner case and connectable to the blade to rotate the blade, a mounting portion recessed from the upper surface of the inner case, and a touch device mounted on the mounting portion and through which a user's manipulation is inputted, in which the touch device may be in close contact with a rear surface of the outer case in a state of being mounted on the mounting portion and may recognize a touch manipulation of the outer case by the user.

The mounting portion may be formed to be stepped downward so that the touch device can be seated.

The mounting portion may be formed on one side edge of the inner case surface.

The outer case may be formed in a hexahedral shape with a lower surface open to receive the inner case therein, and the touch device may be in close contact with the outer case in a state where the inner case is mounted inside the outer case.

The mounting portion may include at least one support protrusion protruding to press and support the touch device toward the outer case.

A touch manipulating portion for inducing user's touch manipulation may be formed on an upper surface of the outer case corresponding to the touch device, and the touch manipulating portion may be formed by surface processing or printing.

The touch device may include a touch PCB on which a touch sensor sensing user's touch manipulation is mounted, a touch PCB case in which the touch PCB is received and fixedly mounted to the inner case, and a touch booster which is mounted on the touch PCB case and which is in close contact with the inner surface of the outer case and transmits pressure to the touch sensor when the outer case is touched and manipulated, and the touch manipulating portion, the touch booster, and the touch sensor may be disposed on the same extension line.

A plurality of case fastening hooks may extend downward along the circumference of the touch PCB case, and the mounting portion may include a fastening hole into which the fastening hook is inserted to constrain the touch PCB case.

The touch booster may be configured to be elastically deformable.

A booster opening in which the touch booster is mounted may be formed on an upper surface of the touch PCB case, and an adhesive member which adheres the touch PCB to the outer case may be provided around the booster opening.

A display device which displays an operating state of the blender may be mounted on the mounting portion, and the display device may be disposed side by side with the touch device.

The display device may include a display PCB in which a large number of LEDs are disposed, and a display PCB case in which the display PCB is received.

The touch PCB and the display PCB may be connected by a connector.

A plurality of through-holes which are formed at the upper surface of the outer case corresponding to a display portion at positions corresponding to the LEDs and through which the light of the plurality of LEDs are transmitted, and the display device outputs information in the form of letters or numbers by selectively transmitting light from the LEDs to the display portion.

A blender according to the present embodiment may include an outer case forming an outer appearance, an inner case configured to be received inside the outer case, a jar detachably provided on a seating portion formed on the inner case and provided with a blade for processing food, a motor assembly provided inside the inner case and providing rotation power of the blade, a mounting portion recessed from the upper surface of the inner case, a touch device mounted on one side of the mounting portion and being in close contact with the outer case in a mounted state to input a touch manipulation of the outer case, and a display device mounted on the other side of the mounting portion and emitting light through the outer case in a mounting state to display an operating state.

A display opening which is opened at a position on which the display device is mounted may be formed on the mounting portion, and a portion of the display device may be disposed below the mounting portion, and a portion of the rest of the display device may protrude upward through the display opening.

The display device may include a display PCB in which a plurality of LEDs are disposed, a light guide which passes through the display opening to be in contact with the outer case and guides light emitted from a plurality of LEDs mounted on the display PCB to a plurality of through-holes formed in the outer case, and a display PCB case which is fixedly mounted on a lower surface of the mounting portion and in which the display PCB is received.

The blender may further include a display portion including the plurality of through-holes to output information in the form of letters or numbers transmitted by the LEDs.

A case fastening portion to which a screw for fixing the display device is fastened may be formed on the display PCB case, and a case coupling portion to which a screw passing through the case fastening portion is fastened may be formed inside the inner case.

A touch opening may be formed at one side of the mounting portion corresponding to the touch device, and the touch display device and the display device may be electrically connected by a connector passing through the touch opening.

The blender according to the present disclosure may have the following effects.

The main body of the blender comprises of an outer case, and an inner case provided inside the outer case. In addition, a mounting portion on which a display device and/or a touch device for displaying information is mounted is formed in the inner case, and these components are shielded by the outer case.

Accordingly, there is an advantage in that it is possible to check the operation input and the state of the blender while improving the outer appearance since the outer appearance of the main body is simple.

In particular, the outer case has a display portion composed of a plurality of through-holes, and the through-holes can display information by numbers or letters by the light of the LED emitted from the display device inside the inner case. In addition, by directly touching the touch manipulating portion of the outer case, manipulation input through the touch sensor of the touch device becomes possible.

Therefore, there is an advantage that both the manipulation input and the status display of the blender are possible while maintaining the outer appearance of the outer case.

In addition, the display device and the touch device are disposed next to each other, or the display portion and the touch manipulating portion are continuously disposed, and thus an effect of improving user manipulability and recognition performance can be expected.

In particular, there is an advantage that a display portion and a touch manipulating portion are disposed on an upper surface of the main body, so that a user can easily identify the display portion and easily access to the touch manipulating portion and input the manipulation thereof.

In addition, the display portion is disposed on the upper surface of the main body so that the user can easily recognize the display portion and the discrimination power can be improved by displaying numbers and letters through the light transmission. In addition, the touch manipulating portion is also located on the upper surface of the main body for easy user access and is continuously disposed with the display portion to allow easier manipulation while viewing the display portion.

In addition, the touch device is fixedly mounted on the upper surface of the mounting portion, and accordingly, the touch device can be in more close contact with the rear surface of the inner case so that the manipulation input can be ensured during touch manipulation of the inner case.

In addition, the rest of the display device except for the portion where the LED is disposed is disposed on the lower surface of the mounting portion and may be fixedly mounted inside the inner case.

Accordingly, the display device and the touch device can be disposed separately from each other and can be assembled on the upper surface and the lower surface of the mounting portion, respectively, so that the display device and the touch device can be fixedly and securely mounted on the narrow inner case.

In addition, since the display device and the touch device have an assembly mounting structure that is independent of each other, it is possible to expect an effect of improving maintenance performance by allowing independent replacement when replacing two components having different life and abnormal life cycles.

In addition, the display device and the touch device are connected by a connector, so that there is an advantage that the disposition and assembly of electric wires can be made easier.

DETAILED DESCRIPTION OF THE EMBODIMENTS

Hereinafter, a specific embodiment of the present disclosure will be described in detail with the accompanying drawings. However, the present disclosure may not be limited to the embodiments in which the spirit of the present disclosure is presented, and it is easy to suggest other embodiments falling within the scope of the present disclosure or other disclosures that are designated by adding, changing, deleting another component, or the like.

Figure 1:
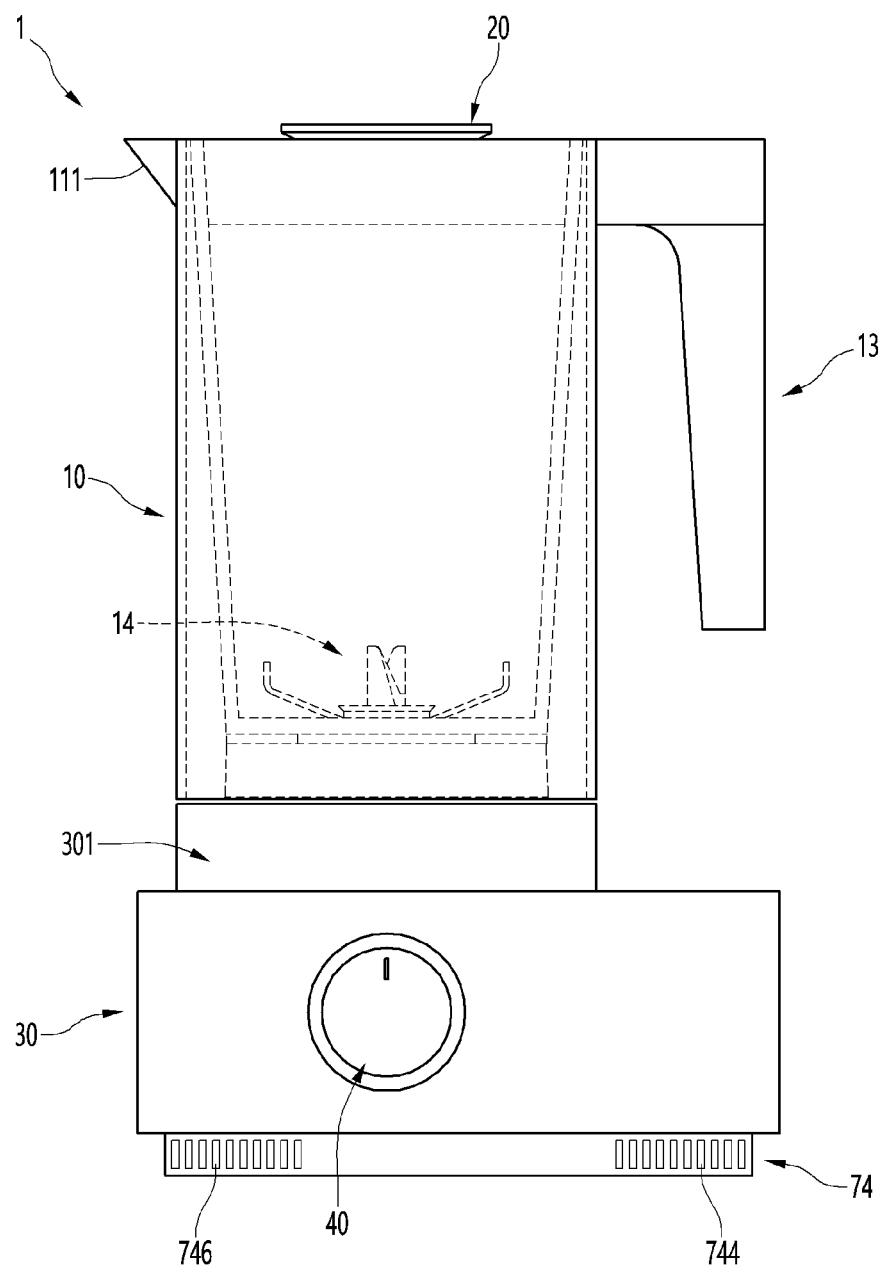
FIG. 1 is a front view illustrating a blender according to an embodiment of the present disclosure.
Figure 2:
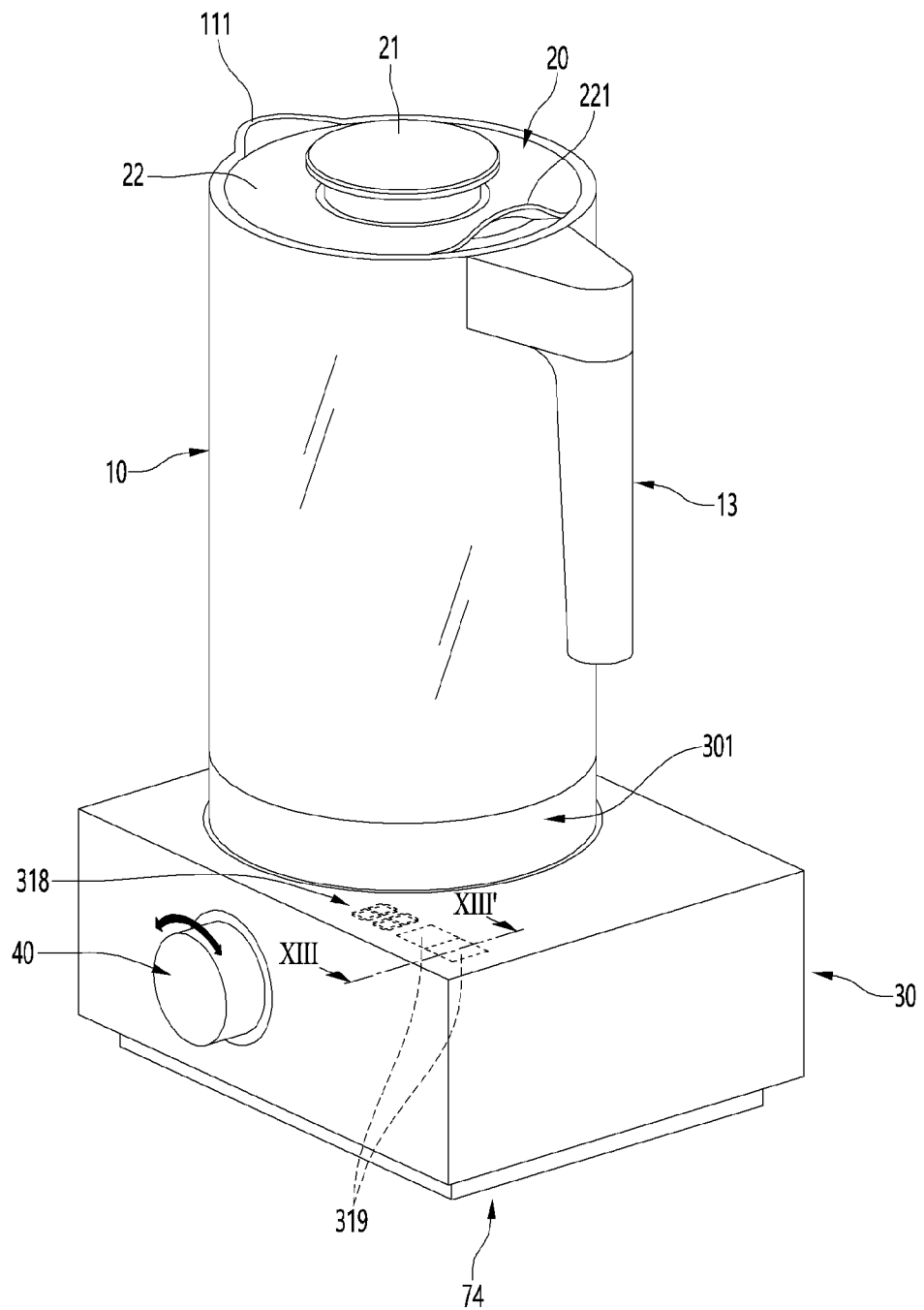
FIG. 2 is a perspective view illustrating the blender.
Figure 3:
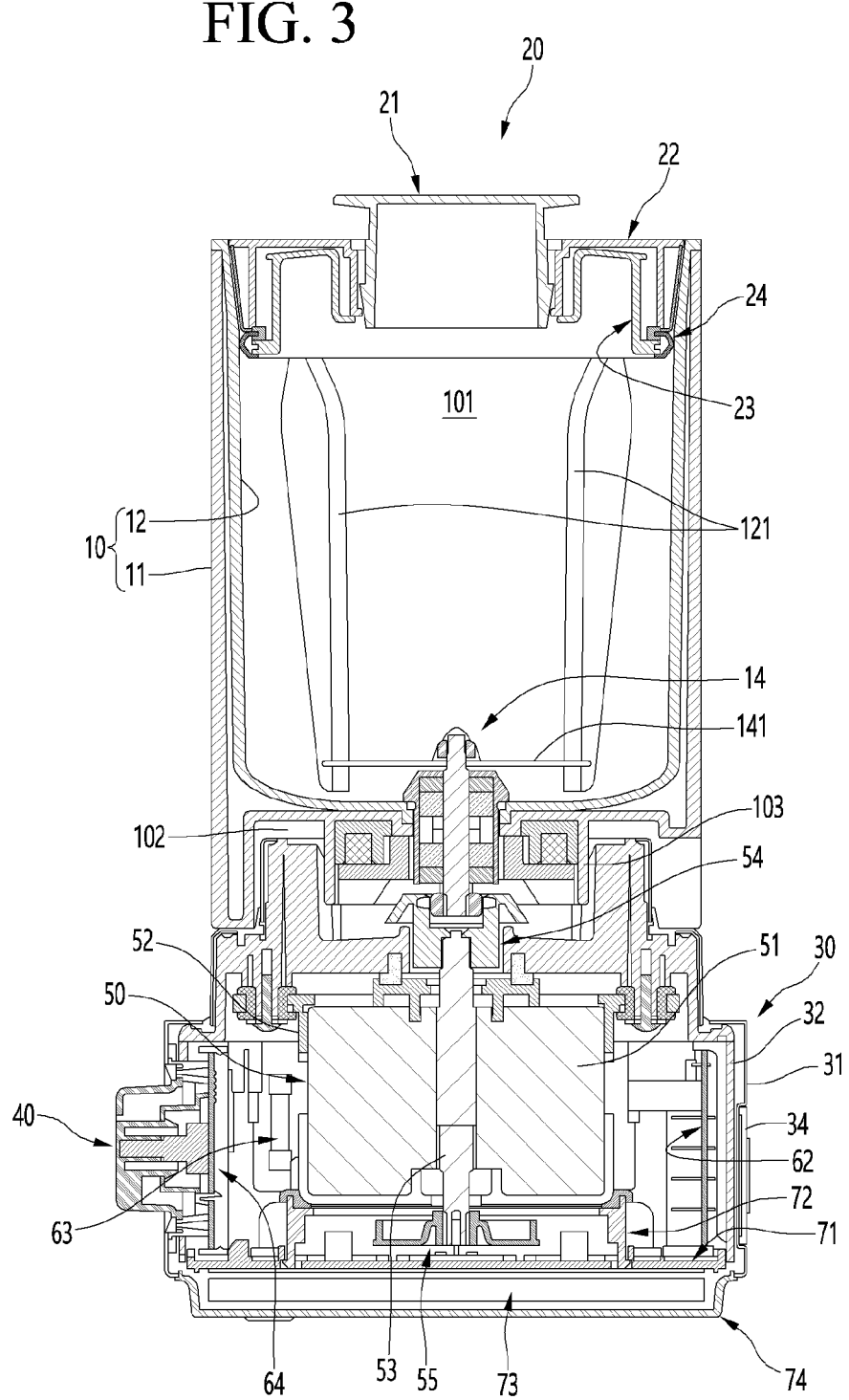
FIG. 3 is a longitudinal sectional view illustrating the blender.

FIG. 1 is a front view illustrating a blender according to an embodiment of the present disclosure, FIG. 2 is a perspective view illustrating the blender, and FIG. 3 is a longitudinal sectional view illustrating the blender.

For the convenience of explanation and understanding, the direction is first defined. The position at which a knob 40 is formed is defined as a front surface or a front side, and the portion to which a power connector (35 in FIG. 6) is connected is defined as a rear surface or a rear side. In addition, the position of the bottom of a main body 30 may be referred to as a lower surface or lower side, and the position of the upper end of the jar 10 may be referred to as an upper surface or an upper side. In addition, the left side based on the knob 40 may be referred to as a left surface or a left side, and the right side based on the knob 40 may be defined as a right side or a right side.

As illustrated, the blender 1 according to an embodiment of the present disclosure may include the main body 30 disposed on the bottom surface, and a jar 10 (which can also be called vessel or container) seated on the upper portion of the main body 30.

The main body 30 may be provided with electrical devices and components, including a motor assembly 50 and a PCB (printed circuit board) device 60 for the operation of the blender 1. In addition, manipulating portions 40 and 65 for manipulating the operation of the blender 1 and a display portion 318 for displaying operation thereof may be provided.

The main body 30 may be formed in a hexahedral shape as a whole, and a seating portion 301 for seating the jar 10 may be formed on an upper surface of the main body 30. The seating portion 301 may be configured to detach the jar 10 in the vertical direction.

The outer appearance of the main body 30 may be formed by an outer case 31 having a metal material or a metal texture, and the outer case 31 may be formed in a hexahedral shape with a bottom surface open. In addition, an inner case 32 may be formed inside the outer case 31, and space in which the motor assembly 50, the PCB device 60, and the like are mounted may be provided inside the inner case 32.

A knob 40 for a user to set the manipulation of the blender 1 may be provided on the front surface of the main body 30. The knob 40 protrudes from the front surface of the main body 30 and can operate and set the operation of the blender 1 through a rotational manipulation.

A bottom cover 74 may be provided on the lower surface of the main body 30. The bottom cover 74 may be coupled with the outer case 31 and/or the inner case 32 and may be formed to be in contact with the bottom surface on which the blender 1 is placed. In addition, the bottom cover 74 allows the outer case 31 and the inner case 32 to be spaced apart from the bottom surface, and a cover suction port 744 and a cover discharge port 746 through which cooling air is suctioned and discharged into and out of the main body 30 may be formed.

A display portion 318 for visualizing an operation state of the blender 1 may be provided on the upper surface of the main body 30. For example, the display portion 318 may have a shape such as at least one seven-segment display.

The display portion 318 may be formed of a combination of minute through-holes 318a penetrating the outer case 31. In detail, the through-hole 318a may be located at a position corresponding to a plurality of LEDs (light emitting diodes) 662a mounted on the display device 66 to be described below, and a plurality of through-holes may be combined to form the shape of letters or numbers. Accordingly, according to the lighting state of the LED 662a, the display portion 318 may be configured to represent letters or numbers. In addition, although not illustrated in detail, a hole-filling member may be filled in the through-hole 318a. The hole-filling member may be made of, for example, a transparent resin material such as silicone, acrylic, or the like and is formed to allow light to pass through so that light emitted from the LED 662a can be transmitted. In addition, it is possible to prevent water or foreign matters from staining the outer case 31 or penetrating the through-hole 318a.

In addition, a touch manipulating portion 319 capable of manipulating the start or stop operation of the blender 1 may be provided on an upper surface of the main body 30. The touch manipulating portion 319 may be disposed side by side on the side of the display portion 318. In other words, when the user wants to manipulates the touch manipulating portion 319, the touch manipulating portion 319 may be disposed close to the display portion 318 enough to be recognized at once.

The touch manipulating portion 319 may be formed at a position corresponding to the touch sensor 654 of the touch device 65 to be described below. For example, the touch manipulating portion 319 may be formed on the outer case 31 by printing or may be formed by surface processing such as etching. In addition, the touch manipulating portion 319 may be formed by attaching a film. Accordingly, the touch manipulating portion 319 may induce a user to manipulate by touching an exact position that can be recognized by the touch sensor 654 and may indicate an accurate touch position or manipulation function to the user.

At least one of the knob 40 and the touch device 65 operated for inputting and setting an operation of the blender 1 may be referred to as a manipulating portion.

In addition, a seating portion 301 may be formed on the upper surface of the main body 30. The seating portion 301 may protrude from the upper surface of the main body 30, and a lower surface of the jar 10 may be inserted into a part of the seating portion 301 which stably supports the jar 10. When the jar 10 is seated on the seating portion 301, the motor assembly 50 and the blade device 14 inside the jar are coupled to each other to transmit the rotational force of the motor assembly 50 to the blade device 14.

The seating portion 301 may be located on one side slightly biased from the center of the main body 30. The entire horizontal length including a handle 13 of the jar 10 and the horizontal length of the main body 30 are formed to correspond to each other. Therefore, the center of the food receiving space of the jar 10 may be located to be eccentric from the center of the main body 30, and the center of the seating portion 301 is also on the same extension line as the center of the jar 10. In addition, the knob 40 may be located at a position corresponding to the centerline of the seating portion 301 and the jar 10 and may be located on one side of the front surface of the main body 30, and thus eccentrically located.

The outer appearance of the seating portion 301 may also be made of the same material as the outer case 31. The seating portion 301 may be made of a metal material or a material having a metal texture to have a sense of unity with the outer appearance of the main body.

A motor assembly 50 may be mounted inside the main body 30 under the seating portion 301. The motor assembly 50 is for rotating the blade device 14 inside the jar 10 and the blade device may be rotated at a high speed. In addition, the motor assembly 50 can adjust the rotational speed according to the manipulation of the knob 40.

The upper end of the motor assembly 50 may be connected to the blade device 14 inside the jar 10. In addition, a cooling fan 55 may be provided at a lower end of the motor assembly 50, and when the motor assembly 50 is driven, the cooling fan 55 may rotate simultaneously with the blade device 14 to force the flow of cooling air inside the main body 30.

Meanwhile, a plurality of PCB devices 60 may be disposed on the inner wall surface of the inner case 32 forming the inner surface of the main body 30. A plurality of PCB devices 60 may be provided and may be disposed on the circumference of the inner surface of the main body 30, that is, on the front surface and the rear surface, and both left and right surfaces thereof, respectively.

In addition, the opened lower surface of the inner case 32 may be shielded by the base plate 71. In addition, an air guide 72 for guiding the discharge of cooling air suctioned by the cooling fan 55 may be provided on the base plate 71.

The predetermined space may be formed between the base plate 71 and the bottom cover 74, and, according to this embodiment, a wireless power device 73 may be provided between the base plate 71 and the bottom cover 74. The wireless power device 73 is capable of supplying power to the motor assembly 50 in a wireless manner using induced electromotive force.

Meanwhile, the jar 10 may be formed in a cylindrical shape corresponding to the outer diameter of the seating portion 301, and the upper surface of the jar can be opened to receive food in a food receiving space 101 formed therein.

The jar 10 may be formed of a material such as glass, Tritan, transparent plastic, or the like to check the state of food inside during the operation of the blender 1. In addition, the jar 10 may include an outer jar 11 forming an outer shape and an inner jar 12 forming an inner space in which food is received.

The inner jar 10 and the outer jar 11 are combined to form the overall shape of the jar 10, and the jar 10 may have a double-wall structure. In addition, the outer jar 11 may be formed in a cylindrical shape having the same outer diameters at the upper end and the lower end, so that the outer appearance of the jar 10 can be seen to be neat. In addition, the outer diameter of the outer jar 11 is formed to be the same as the outer diameter of the seating portion 301 so that the main body 30 and the jar have a sense of unity in a state where the jar 10 is mounted on the main body.

In addition, a main body receiving portion 102 may be formed on the lower surface of the outer jar 11. The main body receiving portion 102 forms space recessed upward from the lower surface of the outer jar 11 and forms space into which a second seating portion 325 to be described below can be inserted. By the coupling of the main body receiving portion 102 and the second seating portion 325, the jar 10 may maintain a state of being attached to the seating portion 301.

The jar 10 may be provided with a blade device 14 at the center of the inner lower surface. The blade device 14 includes a plurality of blades 141 and may be connected to the motor assembly 50. Therefore, when the motor assembly 50 is driven in a state where the jar 10 is seated on the main body 30, the blade 141 may be rotated to crush or cut food inside the jar 10.

In addition, a plurality of inner guides 121 for guiding food to be rotated may be formed inside the jar 10. The inner guide 121 may extend upward from a lower end of the inner surface of the jar 10 to a predetermined height and may extend to a lower surface of the lid 20 when the lid 20 is mounted.

Meanwhile, a spout 111 that can pour the crushed food may protrude on the upper end of the jar 10, and a handle 13 may protrude from one side facing the spout 111. The handle 13 protrudes outward from the upper end of the jar 10 and then extends downward to allow the user to lift or move the jar 10. The protruding end portion of the handle 13 may be located on the same extension line as the side end of the main body 30.

In addition, the lid 20 may be mounted on the opened upper surface of the jar 10. The lid 20 may shield the opened upper surface of the jar 10, and the user, when holding the lid handle 13, can separate the lid 20 from the jar 10 to open and close the opened upper surface of the jar 10. The lid 20 may include a lid upper portion 22, a lid lower portion 23, and a lid handle 221, and a lid gasket 24 may be provided along the circumference of the lid 20.

Figure 4:
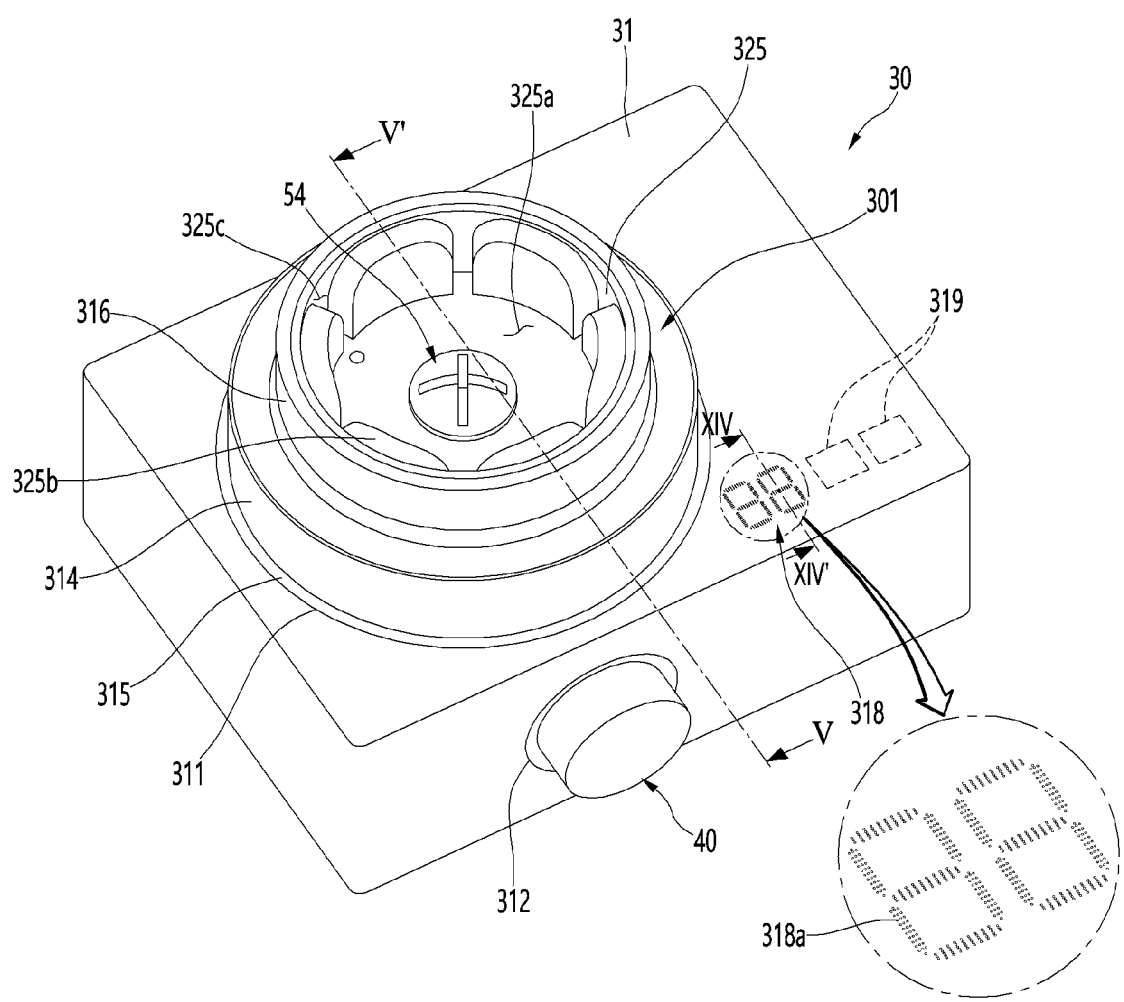
FIG. 4 is a perspective view illustrating a main body that is one component of the blender.
Figure 5:
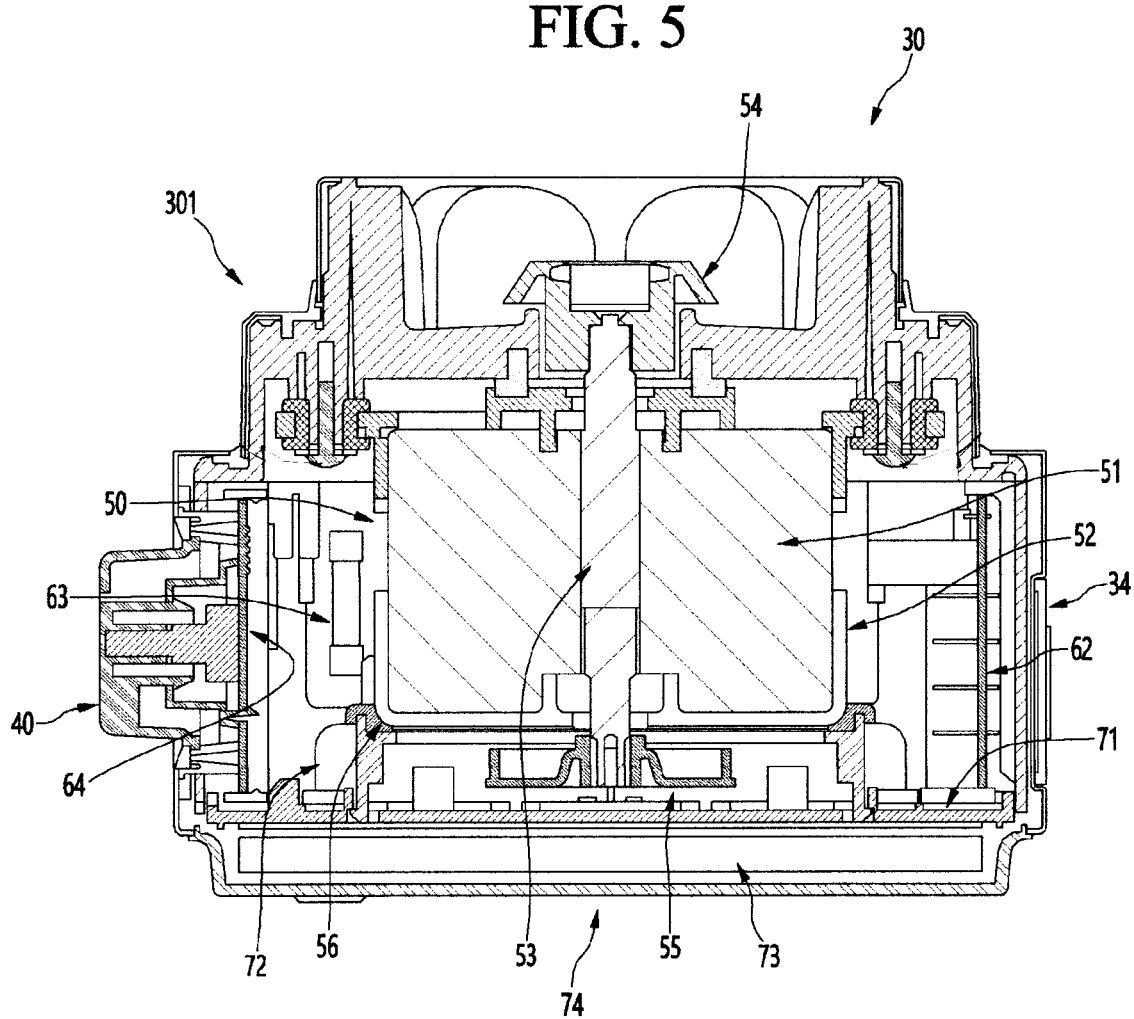
FIG. 5 is a cross-sectional view taken along line V-V' in FIG. 4.
Figure 6:
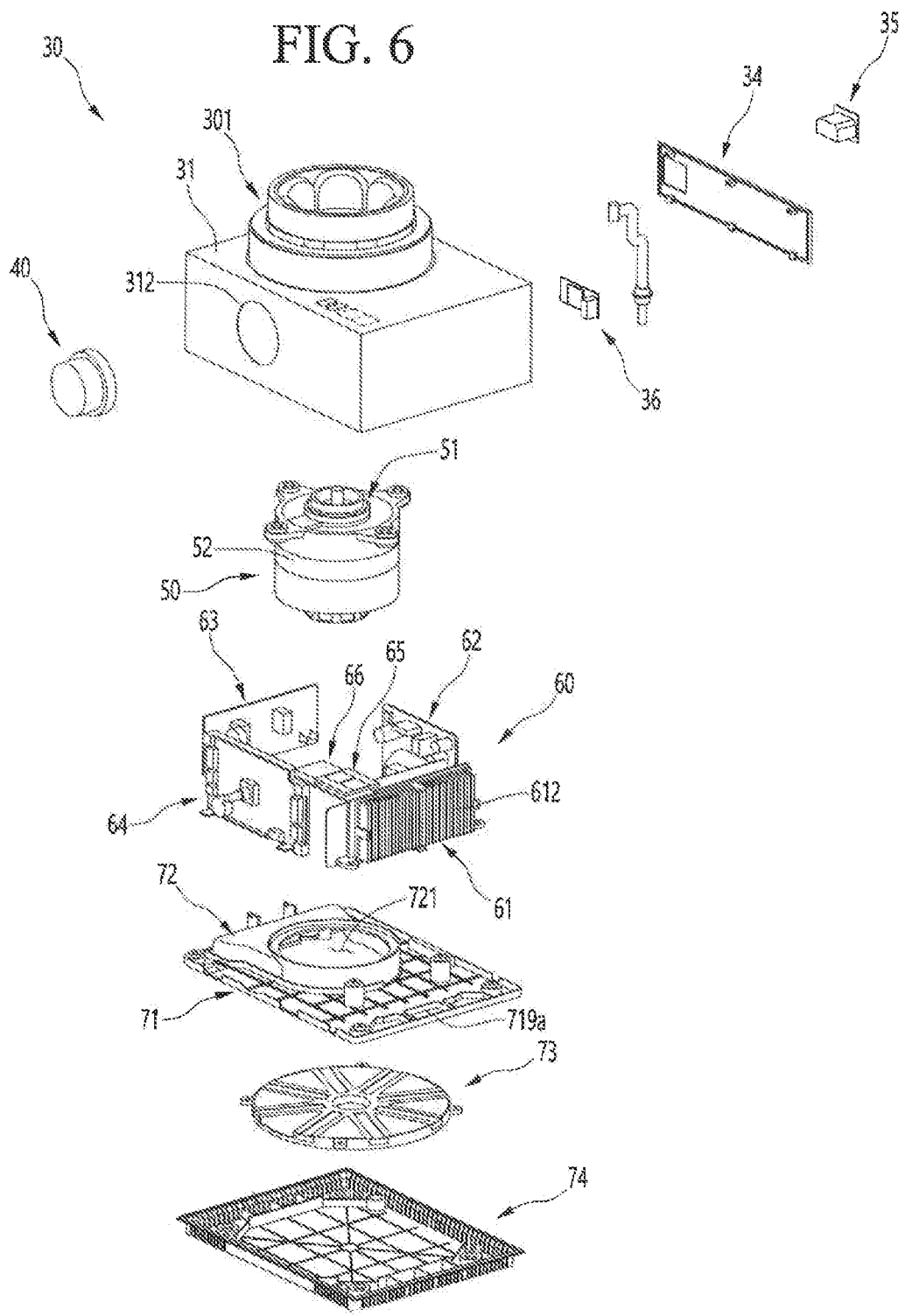
FIG. 6 is an exploded perspective view illustrating the main body as viewed from above.
Figure 7:
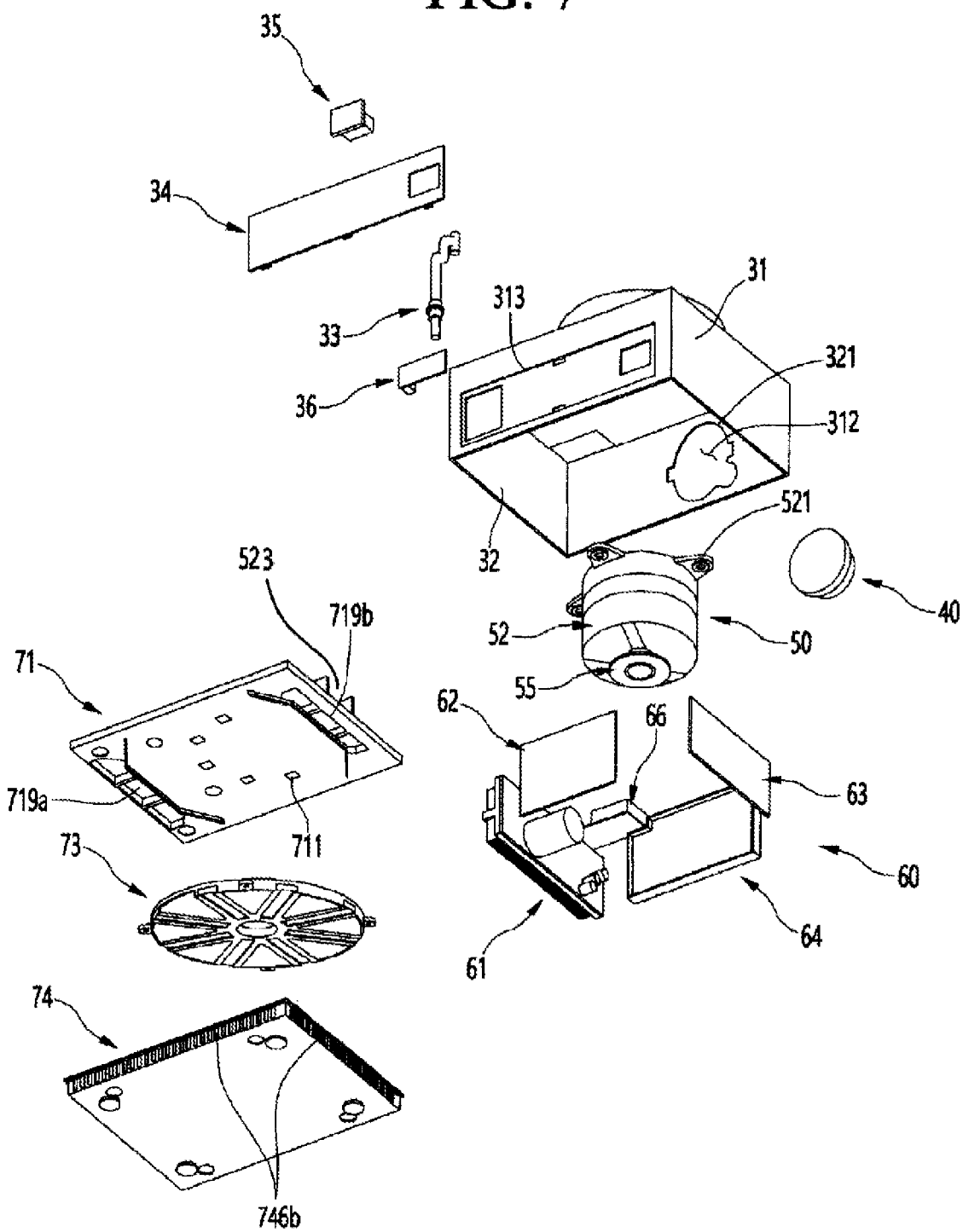
FIG. 7 is an exploded perspective view illustrating the main body as viewed from below.
Figure 8:
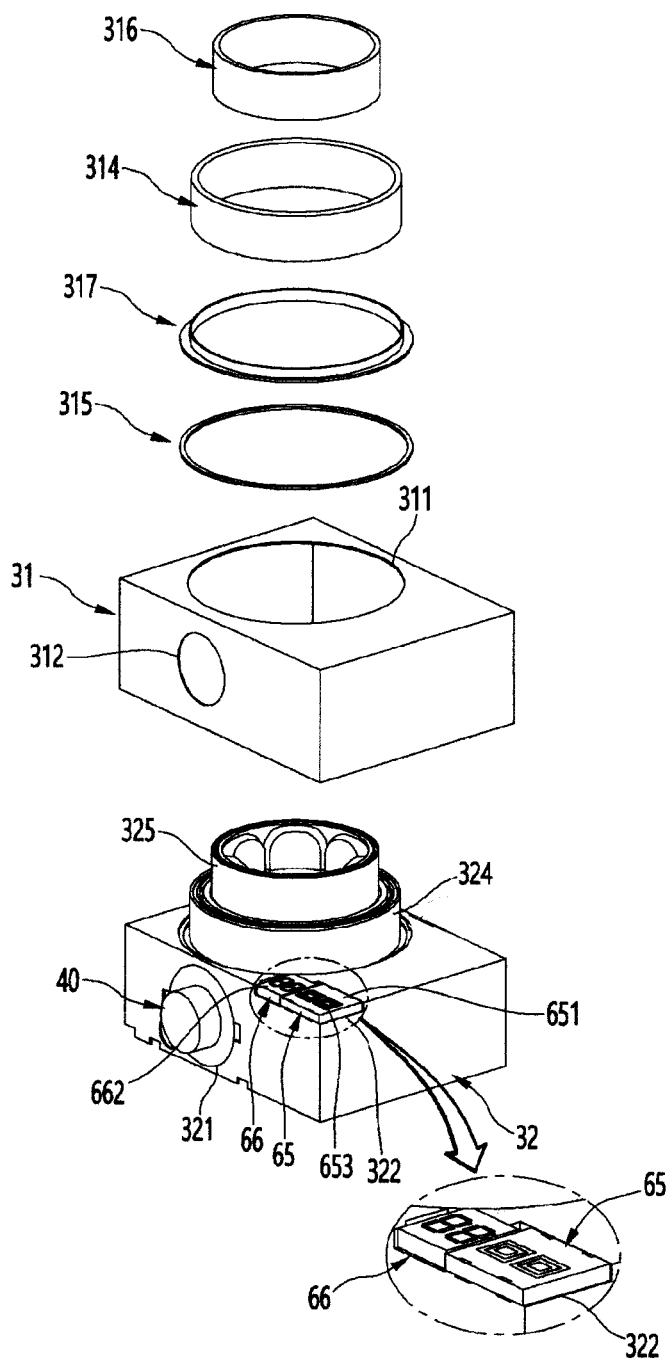
FIG. 8 is an exploded perspective view illustrating components constituting the outer appearance of the main body.

FIG. 4 is a perspective view illustrating a main body that is one component of the blender, FIG. 5 is a cross-sectional view taken along line V-V' in FIG. 4, FIG. 6 is an exploded perspective view illustrating the main body as viewed from above, FIG. 7 is an exploded perspective view illustrating the main body as viewed from below, and FIG. 8 is an exploded perspective view illustrating components constituting the outer appearance of the main body.

As illustrated in the drawings, the main body 30 is formed in a box shape of a rectangular parallelepiped, a seating portion 301 for seating the jar 10 protrudes on the upper surface of the main body 30, and the main body 30 may have a structure in which a knob 40 for manipulating the operation of the blender 1 is disposed on the front surface thereof.

In addition, the internal and overall structure of the main body 30 is formed by the inner case 32, and the outer case 31 is mounted outside the inner case 32 to form the outer appearance of the main body 30. To this end, the inner case 32 may be injected with a plastic material to provide a structure in which internal and external components of the main body 30 can be mounted. In addition, the outer case 31 may be made of a metal material such as stainless steel, and a plate-shaped material may be bent and bonded to provide a very clean and robust outer appearance. Therefore, the outer case 31 can form the outer appearance of the main body 30 in the shape of a hexahedron with a lower surface open, and the inner case 32 provides a structure in which a plurality of components can be mounted inside the outer case 31.

The outer case 31 and the inner case 32 have a shape in which a lower surface is opened, and a motor assembly 50 and a plurality of the PCB devices 60 may be disposed therein. In addition, the opened lower surface of the inner case 32 is shielded by the base plate 71, and the lower surface of the main body 30 may be formed by the bottom cover 74.

Looking at the structure of the main body 30 in more detail, the outer case 31 may include a quadrangular upper surface, a front surface, a rear surface, and both left and right surfaces, which extend downward along the circumference of the upper surface.

An upper surface opening 311 may be formed on the upper surface of the outer case 31. The upper surface opening 311 may be formed to have a diameter equal to or slightly larger than the outer diameter of the seating portion 301. Therefore, when the inner case 32 and the outer case 31 are coupled, an upper portion of the inner case 32 forming the seating portion 301 penetrates through the upper surface opening 311 to be exposed to the outside of the outer case 31.

Meanwhile, a first seating portion deco 314, a second seating portion deco 316, a lower deco 315, and a connecting deco 317 are mounted on an upper portion of the inner case 32 protruding outward of the outer case 31. The seating portion 301 may have an overall outer appearance by the first seating portion deco 314, the second seating portion deco 316, the lower deco 315, and the connecting deco 317. The first seating portion deco 314 and the second seating portion deco 316 may be made of the same material as the outer case 31 or a material having the same texture as the outer case 31.

The first seating portion deco 314 and the second seating portion deco 316 may be formed in a ring shape having a predetermined height. The first seating portion deco 314 has a larger diameter than the second seating portion deco 316, and the connecting deco 317 may be formed in a ring shape connecting an upper end of the first seating portion deco 314 with the second seating portion deco 316.

In addition, the first seating portion deco 314, the second seating portion deco 316, and the connecting deco 317 may be mounted on outer surfaces of a first seating portion 324 and a second seating portion 325 formed in the inner case 32 and the upper surface of the first seating portion 324.

The second seating portion 325 extends upward from the upper surface of the first seating portion 324, and insertion space 325a in which a jar coupling portion (325b) formed in the blade device mounting portion 103 can be received may be formed therein. A jar coupling protrusion 325b and a jar coupling groove 325c to couple with a jar coupling portion protruding from the lower surface of the jar 10 may be formed on the inner surface of the insertion space 325a. In addition, a plurality of the jar coupling protrusions 325b and a plurality of the jar coupling grooves 325c may be continuously disposed along the inner surface of the second seating portion 325. Therefore, when the jar 10 is mounted on the seating portion 301, the jar coupling portion can be fixedly mounted in place by matching with the jar coupling protrusion 325b and the jar coupling groove 325c.

In addition, a knob hole 312 in which the knob 40 is located may be formed on the front surface of the outer case 31. The knob 40 may penetrate through the knob hole 312 and protrude towards the front of the main body 30.

In addition, a plate groove 313 recessed to receive the rear plate 34 may be formed in the rear surface of the outer case 31. In addition, a communication device 36 may be mounted on the inner rear surface of the inner case 32. In addition, a power connector 35 for supplying power to the main body 30 may be mounted on the plate groove 313. The power connector 35 may be mounted through the rear plate 34.

Meanwhile, the inner case 32 may be formed in a box shape with a lower surface open, and a seating portion 301 may be formed on the upper surface of the inner case 32. The inner case 32 may be composed of a planar upper surface as a whole, a front surface, a rear surface, and both left and right surfaces, which extend vertically downward along the circumference of the upper surface. The inner case 32 may be made of a plastic material to be shaped into a relatively complex shape and may provide a structure for mounting the motor assembly 50 and the PCB device 60 therein.

A knob mounting hole 321 may be formed on the front surface of the inner case 32. The knob mounting hole 321 may be opened so that the knob 40 may be disposed in a state of being mounted on the main PCB device 64, and may be located behind the knob hole 311.

A mounting portion 322 may be formed on the upper surface of the inner case 32. The mounting portion 322 may be recessed such that the display device 66 and the touch device 65 can be mounted. The mounting portion 322 is formed to be stepped, and the display device 66 and the touch device 65 may be shielded by the outer case 31 in a state of being mounted on the mounting portion 322.

In addition, a display portion 318 formed in a 7-segment shape by a plurality of minute holes may be formed on the outer case 31 corresponding to the display device 66, and light emitted from the display device 66 is transmitted to be capable of displaying the operation information of the blender 1 in numbers or letters.

In addition, a touch manipulating portion 319 may be formed on the upper surface of the outer case 31 corresponding to the touch device 65 by printing or surface processing. Therefore, the user can manipulate an input for an operation of the blender 1 through the touch device 65 by touching the touch manipulating portion 319. A plurality of touch manipulating portions 319 may be provided. For example, one touch manipulating portion 319 may allow the start or stop and end of the operation of the motor assembly 50 to be inputted, while when the other touch manipulating portion 319 is pressed, the motor assembly 50 is operated, and if the other touch manipulating portion 319 is not pressed, the motor assembly 50 does not operate.

Meanwhile, the motor assembly 50 may be provided in the inner space of the inner case 32. The motor assembly 50 is for rotation of the blade device 14 and may be located at the lower side corresponding to the center portion of the seating portion 301.

The motor assembly 50 may include a motor 51 including a motor shaft 53 extending in the vertical direction, a motor housing 52 in which the motor 51 is housed, a motor-side connecting portion 54 provided on an upper end of the motor shaft 53, and a cooling fan 55 provided at the lower end of the motor shaft 53.

At the upper end of the motor shaft 53, the motor-side connecting portion 54 is provided that couples to the blade device 14 when the jar 10 is mounted. The motor-side connecting portion 54 may be coupled to the blade device 14 to transmit the rotational force of the motor 51. The motor-side connecting portion 54 may be exposed through the upper surface of the inner case 32 and may be located at the center of the insertion space 325a inside the seating portion 301.

The cooling fan 55 is exposed to the outside of the motor housing 52 and may be received inside an air guide 72 to be described below. Therefore, when the cooling fan 55 is operated, air passing through the motor housing 52 may be guided inside the air guide 72.

In addition, airflow may be generated inside the main body 30 according to the driving of the cooling fan 55, and in particular, at least some of the PCB devices 60 disposed outside the motor housing 52 may be located on the airflow path generated by the driving of the cooling fan 55 to be capable of being cooled together.

A plurality of PCB devices 60 for the operation of the blender 1 may be provided inside the inner case 32. The PCB devices 60 may be disposed on the inner surface of the inner case 32, respectively. The plurality of PCB devices 60 separated by their functions may be provided and may be disposed in parallel to the wall surfaces of the inner case 32 at adjacent positions along the inner surface to the inner case 32.

In other words, the PCB devices 60 may be disposed to surround the motor assembly 50 from the outside with respect to the motor assembly 50. Accordingly, when the motor assembly 50 is rotated, the PCB devices 60 may be located on a flow path of air passing through the motor assembly 50, and the PCB devices 60 may be cooled by the air. In addition, more effective heat dissipation or cooling may be possible by allowing the cooling airflow to be concentrated to a PCB particularly having a high heating temperature among the PCB devices 60.

In detail, the PCB devices 60 may include a main PCB device 64, an inverter PCB device 61 for controlling the motor 51, a power PCB device 62 for controlling input power, and a filtering PCB device 63 for removing noise. Of course, the PCB devices 60 may be further provided with an additional PCB device according to the function of the blender 1, or some of the PCB devices 60 may be omitted.

The main PCB device 64 is for controlling the overall operation of the blender 1, and in particular, the knob 40 may be mounted on the main PCB device 64 to receive the manipulation of the knob 40. The main PCB device 64 may be mounted on the inner front surface of the inner case 32 corresponding to the position where the knob 40 is mounted. The main PCB device 64 may be connected to the display device 66 and the touch device 65. Accordingly, the main PCB device 64 may transmit operation information of the blender 1 to the display device 66 and receive a manipulation signal of the touch device 65 when the touch device 65 is manipulated.

The power PCB device 62 is for supplying power input to the inside of the blender 1 and may be mounted on an inner rear surface inside the inner case 32 on which the power connector 35 is disposed. The power PCB device 62 may be generally an SMPS (switching mode power supply). The power PCB device 62 converts a power input from the power connector 35 and supplies a stable power for driving the blender 1. In one embodiment, the power PCB device 62 may receive power from the wireless power device 73 when the blender 1 is used wirelessly, and likewise, the power PCB device converts the power and supplies a stable power for driving the blender 1.

The inverter PCB device 61 is for controlling the speed of the motor 51 and is configured to control the rotational speed of the motor 51 to be variable according to a user's manipulation. Due to the operating characteristics, the inverter PCB device 61 may generate heat at a high temperature during operation, and thus, intensive cooling may be required. To this end, the inverter PCB device 61 may be provided with a heat dissipation member 612 on the inner surface of the inner case 32 corresponding to the plate suction port 719*a* to allow intensive cooling. The inverter PCB device 61 will be described in more detail below.

The filtering PCB device 63 may be connected to the power PCB device 62 and configured to remove noise on a power frequency outputted from the power PCB device 62. In addition, the filtering PCB device 63 may be provided on one side of the inner surface of the inner case 32 facing the inverter PCB 61.

As such, the main PCB device 64, the power PCB device 62, the inverter PCB device 61, and the filtering PCB device 63 may be respectively disposed at positions facing each other. In other words, the PCB devices 60 may be disposed in a form that surrounds the motor assembly 50 at four surfaces of the front, rear, left, and right sides in a state where the motor assembly 50 is placed at the center.

Meanwhile, a base plate 71 may be provided at a lower end of the inner case 32. The base plate 71 shields the opened lower surface of the inner case 32 and may support some of the components inside the inner case 32.

The base plate 71 may be formed in a plate shape and may be formed in a shape corresponding to the opened lower surface of the inner case 32. In addition, the circumference of the base plate 71 may be coupled with the lower end of the inner case 32, and the contact between the circumference of the base plate 71 and the lower end of the inner case 32 may be airtight.

In addition, the plate suction port 719*a* and the plate discharge port 719*b* may be formed on left and right sides of the base plate 71, respectively. The plate suction port 719*a* is formed along one side end of the base plate 71 and forms a passage through which air for cooling flows into the inner case 32 when the motor assembly 50 is driven. In addition, the plate discharge port 719*b* is formed along the other one side end of the base plate 71 and forms a passage through which cooling air inside the inner case 32 is discharged to the outside of the inner case 32.

An air guide 72 may be formed on the upper surface of the base plate 71. The air guide 72 is provided below the motor assembly 50 and connects the plate discharge port 719*b* at the housing lower hole 523 to guide the discharge of air cooling the motor while passing through the motor assembly 50. In other words, the air guide 72 forms an independent airflow space from the motor assembly 50 to the plate discharge port 719*b*.

The air guide 72 supports the lower end of the motor housing 52 and is formed so that the cooling fan 55 can be received therein. Therefore, when the cooling fan 55 is rotated, air passing through the motor housing 52 may flow along the air guide 72.

In addition, the guide hole 721 may be opened at an upper end of the air guide 72. When the bottom plate 71 is coupled to the inner case 32, the lower end of the motor assembly 50 may be seated around the guide hole 721 and the cooling fan 55 may be inserted by passing through the guide hole 721.

In one embodiment, a wireless power device 73 may be provided on the lower surface of the base plate 71. The wireless power device 73 is for wireless power supply to the blender 1 and may be configured to include a plurality of ferrite cores and coils to receive power in an induced electromotive force method. Therefore, the wireless power device 73 can be supplied with power by induced electromotive force when the blender 1 is to be used wirelessly.

A bottom cover 74 may be provided below the base plate 71. The bottom cover 74 forms a lower surface of the main body 30 and is formed to shield the opened lower surface of the outer case 31. In addition, when the wireless power device 73 is mounted on the base plate 71, the wireless power device 73 may be shielded by the bottom cover 74.

The bottom cover 74 may be formed in a plate shape having a size corresponding to the opened lower surface of the outer case 31, and the circumference of the bottom cover 74 extends upward to be capable of coupling with the lower end of the outer case 31. In addition, a cover suction port 744 and a cover discharge port 746 may be formed on the bottom cover 74, and the inflow of external air and the discharge of circulated air from the inside of the main body 30 may be made through the cover suction port 744 and the cover discharge port 746, respectively.

Hereinafter, the structure of the display device 66 and the touch device 65 and the mounting structure thereof will be described in more detail with reference to the drawings.

Figure 9:
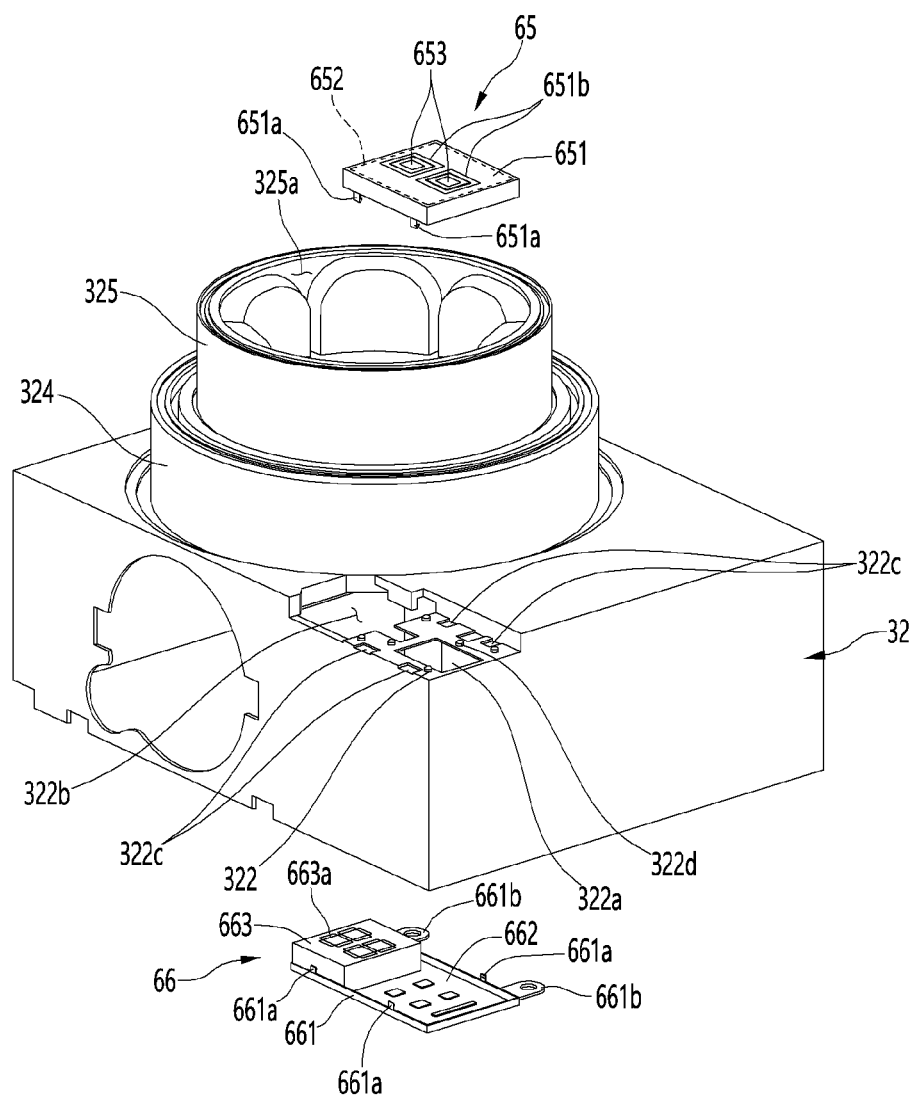
FIG. 9 is an exploded perspective view illustrating a coupling structure between an inner case which is one component of the main body, a touch device, and a display device.
Figure 10:
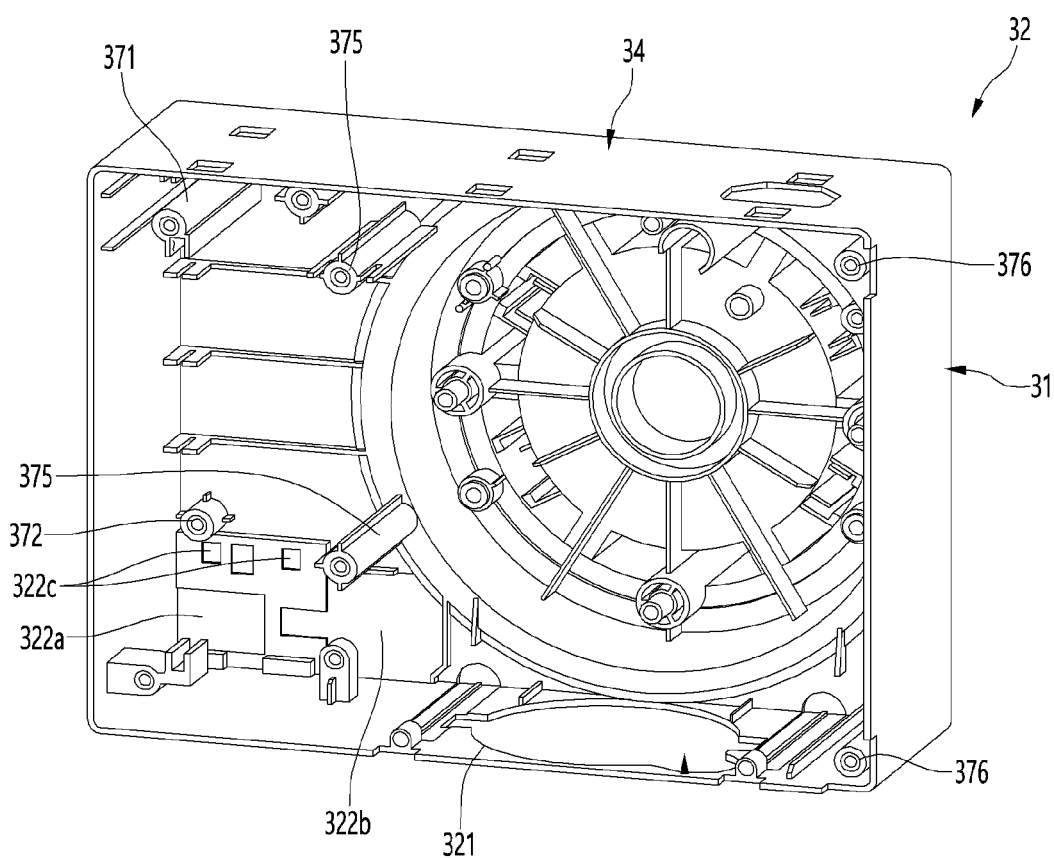
FIG. 10 is a perspective view illustrating the inner case as viewed from below.
Figure 11:
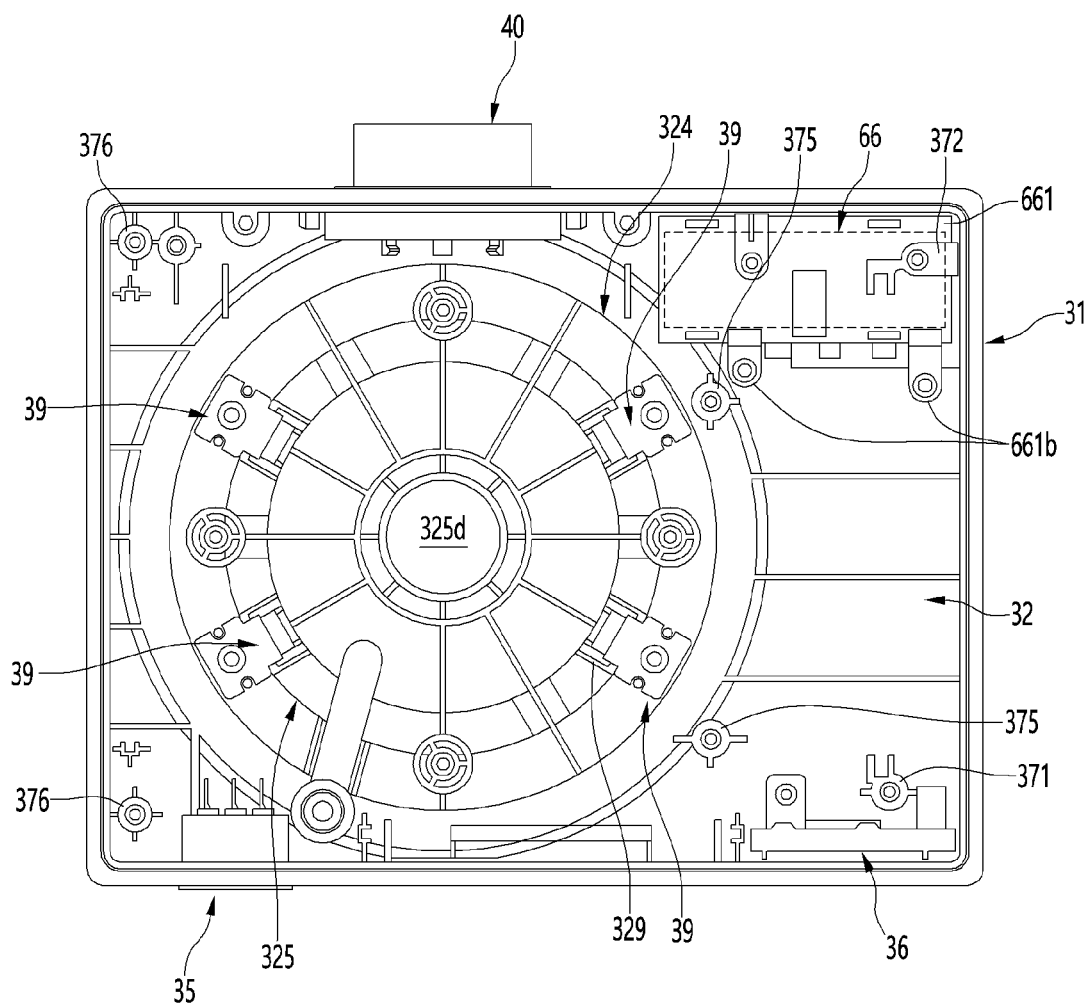
FIG. 11 is a bottom view illustrating the inside of the main body in a state where the touch device and the display device are mounted.
Figure 12:
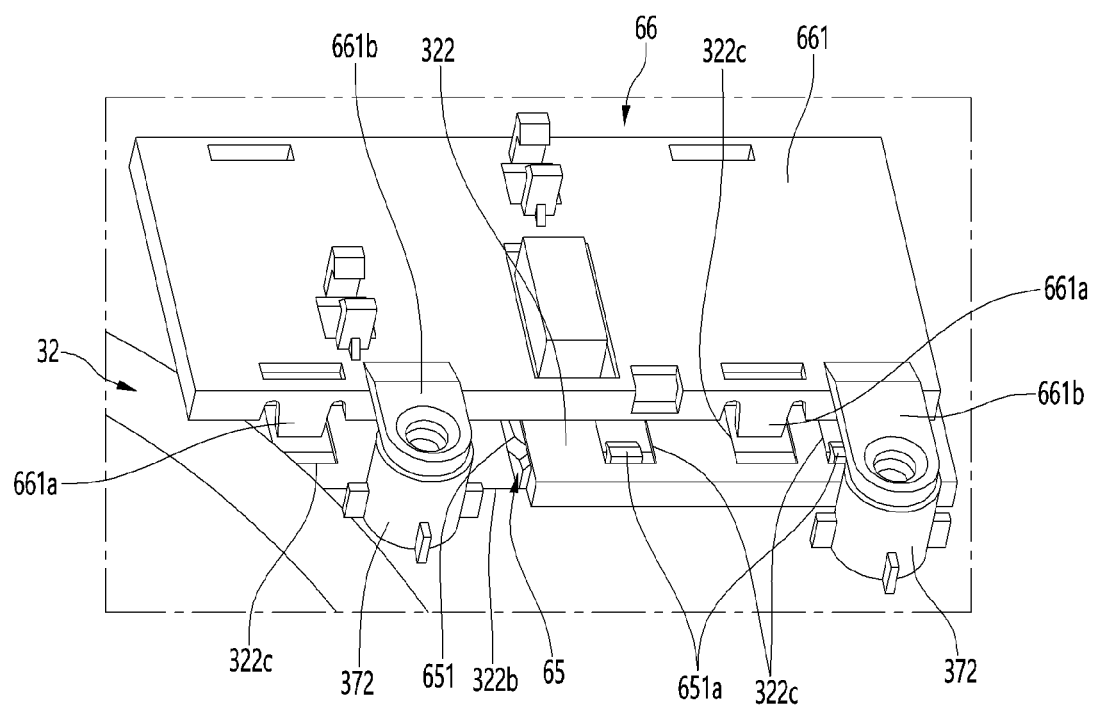
FIG. 12 is an enlarged view illustrating a state where the touch device and the display device are mounted as viewed from below.
Figure 13:
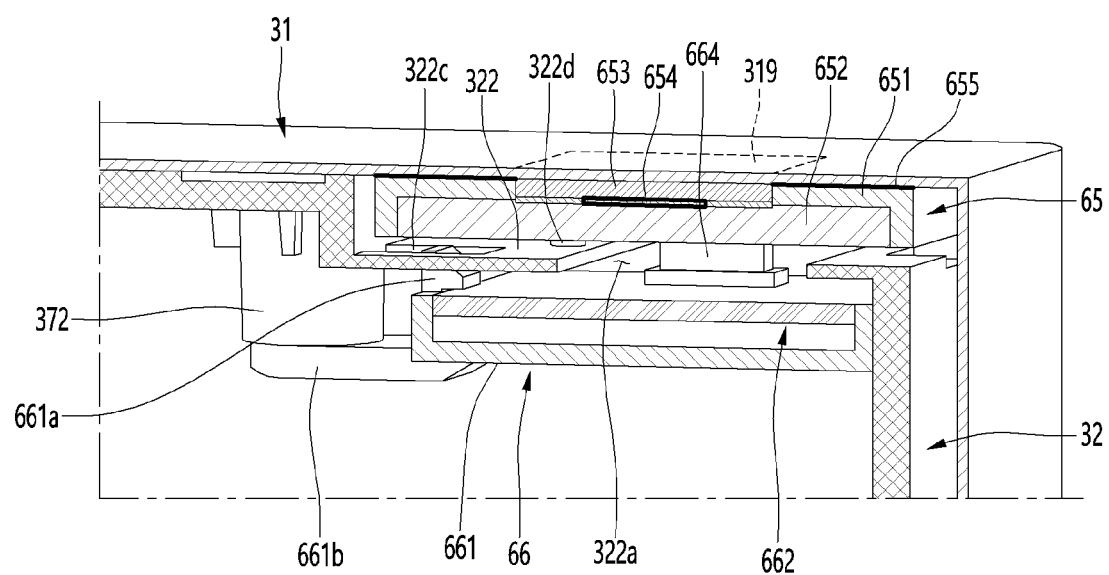
FIG. 13 is a cross-sectional view taken along line XIII-XIII' of FIG. 2.
Figure 14:
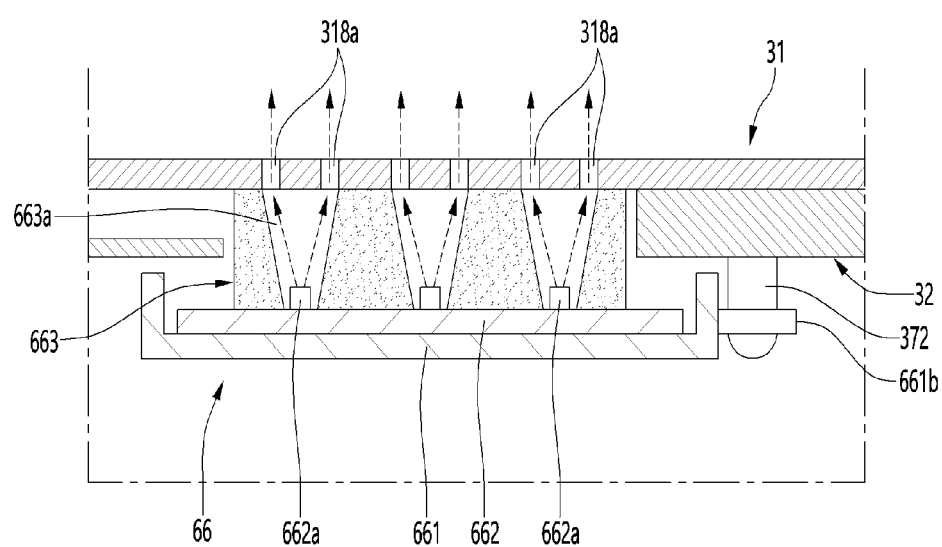
FIG. 14 is a cross-sectional view taken along line XIV-XIV' of FIG. 4.

FIG. 9 is an exploded perspective view illustrating a coupling structure between an inner case which is one component of the main body, a touch device, and a display device, FIG. 10 is a perspective view illustrating the inner case as viewed from below, FIG. 11 is a bottom view illustrating the inside of the main body in a state where the touch device and the display device are mounted, FIG. 12 is an enlarged view illustrating a state where the touch device and the display device are mounted as viewed from below, FIG. 13 is a cross-sectional view taken along line XIII-XIII' of FIG. 2, and FIG. 14 is a cross-sectional view taken along line XIV-XIV' of FIG. 4.

As illustrated in the drawings, the inner case 32 may be formed in a hexahedral shape with a lower surface open. The inner case 32 may be inserted through the opened lower surface of the outer case 31 and may be completely received in the outer case 31.

In addition, a first seating portion 324 and a second seating portion 325 protruding upward may be formed to be stepped on the upper surface of the inner case 32. In addition, a sensing device receiving portion 329 in which a sensing device 39 for sensing the jar 10 is mounted may be formed at a position corresponding to the second seating portion 325. The sensing device 39 may be disposed at a position corresponding to the inner surface of the second seating portion 325, and a plurality of sensing devices may be disposed radially based on the center of the second seating portion 325.

In addition, a structure for coupling with the base plate 71 shielding the opened lower surface of the inner case 32 may be provided inside the inner case 32. Looking at the coupling structure between the inner case 32 and the base plate 71, a plurality of bosses 371, 375, and 376 may be formed inside the inner case 32 for coupling with the base plate 71. The plurality of bosses 371, 375, and 376 may extend toward the opened lower surface from the upper surface inside the inner case 32.

Meanwhile, the mounting portion 322 may be formed on the upper surface of the inner case 32. The mounting portion 322 may be formed to be stepped at an edge of one surface of the upper surface of the inner case 32. For example, the mounting portion 322 may be formed in a shape recessed in an edge region formed by a front end and a right end of the upper surface of the inner case 32. In addition, the mounting portion 322 may be formed in a flat shape having a size in which the display device 66 and the touch device 65 can be mounted side by side.

In addition, the stepped height of the mounting portion 322 may be formed to a height corresponding to the height of the touch device 65. Therefore, when the inner case 32 and the outer case 31 are assembled in a state where the touch device 65 is mounted on the mounting portion 322, the upper surface of the touch device 65 may be in close contact with the lower surface of the outer case 31.

The mounting portion 322 may include a display opening 322b and a touch opening 322a. The display opening 322b may be opened at a position corresponding to a position where the display device 66 is mounted and may be formed to penetrate the mounting portion 322 in the vertical direction. Accordingly, a part of the display device 66 may pass through the display opening 322b and be directed towards the outer case 31.

In addition, the touch opening 322a may be opened at a position corresponding to a position where the touch device 65 is mounted. The touch opening 322a may penetrate the mounting portion 322 in the vertical direction and may be located at a side spaced apart from the display opening 322b. The touch opening 322a may be formed so that a connector 664 connecting the touch device 65 disposed on an upper surface of the mounting portion 322 and the display device 66 disposed on a lower surface of the mounting portion 322 passes therethrough.

Meanwhile, a support protrusion 322d may be formed outside the touch opening 322a. The support protrusion 322d may protrude upward from the mounting portion 322 corresponding to a position where the touch device 65 is mounted. The support protrusion 322d supports the touch device 65 from below so that the touch device 65 is in close contact with the lower surface of the outer case 31. In other words, the support protrusion 322d may have a height configured such that the upper surface of the touch device 65 can be in close contact with the lower surface of the outer case 31. In addition, a plurality of support protrusions 322d may be formed and may be configured to support a plurality of points on the lower surface of the touch device 65 from the lower side of the touch device 65.

A fastening hole 322c may be formed on the mounting portion 322. The fastening hole 322c may be configured such that the fastening hook 661a formed on the touch device 65 and the display device 66 can be fastened. A plurality of fastening holes 322c may be formed and evenly disposed on the mounting portion 322 so that the touch device 65 and the display device 66 are fixedly mounted.

In addition, a case coupling portion 372 to allow the display device 66 to be mounted on the inner surface of the inner case 32 may be formed on the inside of the inner case 32. The case coupling portion 372 may be formed in a boss shape to which screws may be fastened and may be formed to protrude downward from the inner upper surface of the inner case 32. In addition, the case coupling portion 372 is formed at a position corresponding to the case coupling portion 661b of the display device 66, and a screw penetrating the case coupling portion 661b can be fastened to the case coupling portion 372. Therefore, the display device 66 can be fixedly and securely mounted on the lower surface of the mounting portion 322.

Hereinafter, the structures of the touch device 65 and the display device 66 will be described in more detail.

As illustrated in FIGS. 9, 13, and 14, the touch device 65 includes a touch PCB 652 on which a touch sensor 654 is mounted, and a touch PCB case 651 in which the touch PCB 652 is received.

A touch sensor 654 may be provided on the touch PCB 652. For example, the touch sensor 654 may be a touch sensor using a piezo-type piezoelectric element. Accordingly, the touch sensor 654 may sense a slight deformation of the outer case 31 so that a touch input is made when the pressing of the metal outer case 31 is manipulated.

A plurality of touch sensors 654 may be provided and may be located at positions corresponding to the touch manipulating portion 319. Therefore, when the user manipulates the touch manipulating portion 319, the touch sensor 654 can recognize the manipulation thereof.

The touch PCB case 651 may be formed to be opened downward and may be formed to a size in which the touch PCB 652 can be received. In addition, the touch PCB case 651 may be formed to have a size that can be seated on the mounting portion 322 without covering the display opening 322b when mounted on the mounting portion 322.

In addition, a touch case fastening hook 651a protruding downward may be formed around the touch PCB case 651. The touch case fastening hook 651a may be fastened to the fastening hole 322c formed on the mounting portion 322 when the touch device 65 is mounted. Of course, the touch PCB case 651 may be configured to be simply supported without having a separate constrained coupling structure on the mounting portion 322.

In addition, a case opening 651b may be formed on an upper surface of the touch PCB case 651, and a touch booster 653 may be provided in the case opening 651b. The case opening 651b may be located at a position corresponding to the touch sensor 654, and the touch booster 653 mounted on the case opening 651b may also be located above the touch sensor 654.

The touch booster 653 is for improving touch recognition of the touch sensor 654, may be made of plastic or rubber material and may have an elastically deformable material or structure. For example, the touch booster 653 may be cut in a spiral shape around the central portion, so that pressure applied to the touch booster 653 may be concentrated at the center portion. In other words, during the minute deformation of the outer case 31, it is possible to deform the touch booster 653 which is in close contact with the outer case 31, and further, the touch booster 653 can press the touch sensor 654.

The touch manipulating portion 319, the touch booster 653, and the touch sensor 654 may be located on the same extension line. Accordingly, when the user touches the touch manipulating portion 319, the minute deformation of the outer case 31 is effectively transmitted to the touch sensor 654 through the touch booster 653, so that the recognition of the touch sensor 654 can be guaranteed.

Meanwhile, an adhesive member 655 may be provided on an upper surface of the touch PCB case 651. The adhesive member 655 may allow the upper surface of the touch PCB case 651 and the lower surface of the outer case 31 to adhere to each other. For example, the adhesive member 655 may be made of double-sided tape or adhesive. The adhesive member 655 may be entirely disposed on the upper surface of the touch PCB case 651 except for the case opening 651b and may be adhered to the lower surface of the outer case 31. Therefore, the upper surface of the touch device 65 always maintains a state of adhesion to the bottom surface of the outer case 31, and the touch sensor 654 can more effectively sense the touch manipulation through the touch booster 653 during touch manipulation of the outer case 31.

At least a part of the touch PCB 652 may be exposed through the touch opening 322a, and one end of the connector 664 may be connected to the touch PCB 652 through the touch opening 322a. The other end of the connector 664 may be connected to the display PCB 662 of the display device 66. Therefore, the touch PCB 652 and the display PCB 662 that are vertically disposed with respect to the mounting portion 322 may be electrically connected.

In addition, operations such as signal processing and power supply of the touch PCB 652 may be performed via the display PCB 662. Therefore, there is no need for a structure for disposing separate electric wires and the electric wires to be connected with the touch device 65 from the outside of the inner case 32, and an operable state can be achieved through the connection with the display device 66.

The display device 66 may include a display PCB 662 in which the LED 662a is mounted and a display PCB case 661 in which the display PCB 662 is received.

A plurality of the LEDs 662a may be mounted on the display PCB 662. The plurality of LEDs 662a may be disposed to correspond to the disposition of the plurality of through-holes 318a formed on the display portion 318 of the outer case 31. In other words, the through-hole 318a through which light is transmitted may be determined according to the on and off of the plurality of LEDs 662a, and the display portion 318 can display operation information of the blender 1 in the form of letters or numbers through the through-holes 318a through which light is transmitted.

Meanwhile, a light guide 663 may be provided on the display PCB 662. The light guide 663 may be disposed at a position where the LED 662a is mounted among the display PCB 662. The light guide 663 guides the light emitted from the LED 662a toward the through-hole 318a and is formed to be capable of receiving the LED 662a therein.

In detail, a guide hole 663a corresponding to the shape of the through-hole 318a may be formed through the light guide 663. The guide hole 663a may penetrate the light guide 663 in the vertical direction. The through-hole 318a may be disposed at an upper end of the guide hole 663a, and the LED 662a may be disposed at a lower end of the guide hole 663a. In other words, the LED 662a may emit light from inside the guide hole 663a, and the light emitted from the LED 662a can be guided to transmit the corresponding through-hole along the guide hole 663a. A plurality of guide holes 663a may be formed and may be formed in a shape corresponding to the through-holes 318a.

In addition, the light guide 663 may be located inside the display opening 322b. In detail, the display PCB 662 is disposed below the mounting portion 322, and the light guide 663 penetrates the display opening 322b from below the mounting portion 322 to protrude upward. In addition, the upper surface of the light guide 663 may be in contact with the lower surface of the outer case 31. At this time, the position of the LED 662a may also be located in the inner region of the display opening 322b.

Meanwhile, the display PCB 662 may be located below the mounting portion 322 and may be located inside the inner case 32. In addition, the display PCB 662 may be received in the display PCB case 661. A display fastening hook 661a may be formed around the display PCB case 661. A plurality of display fastening hooks 661a may be provided and may be mounted in a fastening hole 322c formed in the mounting portion 322 so that the display device 66 can be fixed to the mounting portion 322.

In addition, a display case fastening portion 661b may protrude on one side of the display PCB case 661, and the display case fastening portion 661b is screwed to the case coupling portion 372 formed on the inner case 32 and thus coupled. The display device 66 may be fixedly mounted on the lower surface of the mounting portion 322 in more detail than the inner surface of the inner case 32 by fastening the screw.

Meanwhile, the display PCB 662 and the display PCB case 661 may extend below the touch PCB 652. In other words, the display PCB 662 and the touch PCB 652 may overlap each other when viewed from above. In addition, an overlapping portion between the display PCB 662 and the touch PCB 652 may be located at a position corresponding to or adjacent to the touch opening 322*a*. In addition, the display PCB 662 and the touch PCB 652 may be connected by the connector 664.

In a state where the connector 664 is mounted on the display PCB 662 or the touch PCB 652, when the touch device 65 and the display device 66 are assembled, the connector 664 may be naturally coupled to the unmounted display PCB 662 or the touch PCB 652 as they are located opposite to each other. In other words, the display PCB 662 or the touch PCB 652 may be connected to each other in a process of mounting the touch device 65 and the display device 66 to the mounting portion 322 without requiring additional work for connecting using a separate connector.

The inner case 32 may be inserted into the outer case 31 in a state where the display device 66 and the touch device 65 are disposed on the mounting portion 322. In addition, by assembling the inner case 32 and the outer case 31, the upper surface of the display device 66 and the upper surface of the touch device 65 may be in close contact with the inner surface of the outer case 31.

What is claimed is:

1. A blender comprising:
   an outer case made of a metal material and forming an outer appearance which includes an upper surface side surfaces extending downward from ends of the upper surface and an opened lower surface;
   inner case provided inside the outer case;
   a jar capable of seating on a seating portion formed on an upper surface of the inner case and provided with a blade for processing food;
   a motor assembly provided inside the inner case and connectable to the blade to rotate the blade;
   a mounting portion recessed from the upper surface of the inner case and including a display opening penetrating the mounting portion to open to a space in the inner case;
   a touch device mounted on an upper surface of the mounting portion and disposed between the outer case and the inner case, and including a touch sensor;
   a display device disposed through the display opening such that a portion of the display device is inside the inner case and is mounted on a lower surface of the mounting portion and disposed below the touch device, and
   the display device including a plurality of light emitting diodes (LEDs) and a light guide to guide light emitted from the plurality of LEDs to a plurality of through-holes formed in the outer case,
   wherein the light guide is disposed through the display opening to be in contact with the upper surface of the outer case,
   wherein the touch device and the light guide make contact with the upper surface of the outer case in a state the inner case is inserted into the outer case, and
   an upper surface of the touch device and the light guide are covered by the upper surface of the outer case to prevent the touch device and display device from exposure to outside environment, and
   the touch sensor senses a user's touch manipulation at the upper surface of the outer case corresponding to the upper surface of the touch device by piezoelectric effect, and
   the display device emits light through the plurality of through-holes.

2. The blender of claim 1,
   wherein the mounting portion is formed to be stepped downward on the inner case, and a stepped height of the mounting portion is formed to a height corresponding to a height of the touch device.

3. The blender of claim 1,
   wherein the outer case is formed in a hexahedral shape with the opened lower surface to receive the inner case therein.

4. The blender of claim 3,
   wherein the inner case contacts the upper surface and side surfaces of the outer case, and
   the mounting portion is formed on one side edge of the inner case.

5. The blender of claim 1, comprising
   one or more support protrusions at a bottom surface of the touch device to support the touch device such that the touch device makes contact with the upper surface of the outer case when the inner case is inserted into the outer case in a state of being mounted on the mounting portion,
   wherein the support protrusion protrude upward from the upper surface of the mounting portion to press and support the touch device towards the outer case.

6. The blender of claim 1, further comprising
   a touch manipulating portion formed on a portion of the upper surface of the outer case corresponding to the touch device,
   wherein the touch manipulating portion is formed by surface processing or printing.

7. The blender of claim 6,
   wherein the touch device includes
   a touch printed circuit board (PCB) on which the touch sensor is mounted;
   a touch PCB case in which the touch PCB is received and fixedly mounted to the inner case; and
   a touch booster which is mounted on the touch PCB case and which is adjacent to the inner surface of the outer case and transmits pressure to the touch sensor when the outer case is manipulated, and
   the touch manipulating portion, the touch booster, and the touch sensor are disposed vertically to each other.

8. The blender of claim 7, further comprising:
   a plurality of case fastening hooks extending downward along a circumference of the touch PCB case; and
   the mounting portion includes a plurality of fastening holes into which the fastening hooks are inserted to constrain the touch PCB case.

9. The blender of claim 7,
   wherein the touch booster is elastically deformable.

10. The blender of claim 7, further comprising:
    a booster opening in which the touch booster is mounted is formed on an upper surface of the touch PCB case; and
    an adhesive member to adhere the touch PCB to the outer case is provided around the booster opening.

11. The blender of claim 1, further comprising
    the display device to display an operating state of the blender mounted on the mounting portion, wherein the display device is disposed side by side with the touch device.

12. The blender of claim 11,
    wherein the display device includes
    a display PCB in which the plurality of LEDs are disposed, and
    a display PCB case in which the display PCB is received.

13. The blender of claim 12,
wherein the touch device includes a touch PCB on which the touch sensor is mounted, and
the touch PCB and the display PCB are connected by a connector.

14. The blender of claim 12, further comprising:
the plurality of through-holes which are formed at the upper surface of the outer case corresponding to a display portion at positions corresponding to the plurality of LEDs and through which light of the plurality of LEDs are transmitted, and
the display device outputs information in a form of letters or numbers by selectively transmitting the light from the plurality of LEDs to the display portion.

15. The blender of claim 1,
wherein the display device further includes
a display printed circuit board (PCB) in which the LEDs are disposed, and
a display PCB case which is fixedly mounted on a lower surface of the mounting portion and in which the display PCB is received.

16. The blender of claim 15,
wherein at least a portion of the display device is overlapped with the touch device.

17. The blender of claim 15,
wherein the light guide and the touch device are placed side by side in the mounting portion, and
the upper surfaces of the light guide and the touch device have same height.

18. The blender of claim 15,
wherein the display device is configured to output information in a form of letters or numbers by selectively transmitting light from the plurality of through-holes to a display portion.

19. The blender of claim 15, further comprising:
a case fastening portion formed on the display PCB case to which a screw for fixing the display device to the display PCB case is fastened; and
a case coupling portion formed inside the inner case to which a screw passing through the case fastening portion is fastened.

20. The blender of claim 1, further comprising
a touch opening formed on one side of the mounting portion corresponding to the touch device,
wherein the touch device and the display device are electrically connected by a connector passing through the touch opening.

* * * * *